United States Patent Office 2,694,076
Patented Nov. 9, 1954

2,694,076
PRODUCTION OF FORMALDEHYDE POLYMERS

Robert L. Craven, Westfield, N. J., assignor to E. I. du Pont de Nemours and Company, Wilmington, Del., a corporation of Delaware No Drawing. Application March 1, 1951,
Serial No. 213,476

10 Claims. (Cl. 260—340)

This invention relates to a new and improved process for the production of formaldehyde polymers. More particularly it relates to a process whereby high strength aqueous formaldhyde solutions can be concentrated at a greatly accelerated rate to paraformaldehyde which can then be vaporized by heating at elevated temperatures without the formation of undesirable tars and sugars.

This application is a continuation-in-part of my copending application S. N. 84,651, filed March 31, 1949, now Patent 2,551,365.

The commercial production of paraformaldehyde is usually carried out by the vacuum evaporation of aqueous solutions of formaldehyde. Formaldehyde solutions of 30 to 50% are placed in a receptacle provided with stirring means and means to place the contents of the receptacle under subatmospheric pressure, usually a pressure of between 25 to 600 mm. of mercury. The solution gradually loses water and the formaldehyde and polyoxymethylene glycol molecules condense to form solid paraformaldehyde (93% to 97% formaldehyde). By this well-known process, when the concentration has reached about 80 to 85% formaldehyde, sufficient formaldehyde polymer is precipitated to form a paste which has a very poor heat transfer coefficient, and it requires continuous agitation during a further period of heating of about 4 to 6 hours to evaporate the remaining water to yield a powdered polymer of about 95% formaldehyde concentration.

My above application describes an improved process for the production of paraformaldehyde which involves the addition of 0.01 to 1.0% by weight of an alkaline catalyst from the group consisting of sodium and potassium formates, carbonates, hydroxides and acetates to an aqueous solution of formaldehyde having a formaldehyde concentration of 75% to 90% at a temperature between 80° and 110° C. and subjecting the resulting mixture to agitation until powdered paraformaldehyde of 94 to 96% formaldehyde concentration is obtained. The added alkali catalyzes polymerization of the formaldehyde with liberation of heat so that the time for converting concentrated formaldehyde to solid paraformaldehyde is reduced and high strength polymers (98 to 99%) can be readily and efficiently produced. However, paraformaldehyde produced by this alkali catalyzed method tends to form tars and sugars in objectionable amounts when it is subsequently vaporized by heating, e. g., when used as a source of anhydrous gaseous formaldehyde.

It is an object of this invention to provide an improved alkali catalyzed process for the production of paraformaldehyde by rapid removal of water from concentrated aqueous formaldehyde solutions, specifically an improvement in the process of my above-mentioned application.

It is another object of this invention to provide a stabilizer for paraformaldehyde made by the alkali catalyzed process of my above application.

It is a further object to produce an improved paraformaldehyde product stabilized against formation of tar when vaporized to gaseous formaldehyde by heat.

Other objects of the invention will appear hereinafter.

The objects of this invention may be accomplished by adding a small amount of sodium tetraborate, or a compound yielding sodium tetraborate under the conditions of use, to aqueous formaldehyde solutions intended for production of paraformaldehyde, mixing thoroughly and then adding to the mixture a small amount of alkaline catalyst selected from the group consisting of sodium and potassium formates, carbonates, hydroxides and acetates, and continuing agitation and concentrating until powdered paraformaldehyde of the desired formaldehyde concentration is obtained. The resulting paraformaldehyde composition comprises an intimate mixture of polymerized formaldehyde with small amounts of the catalyst and stabilizer.

It has been discovered that sodium tetraborate is an excellent stabilizer against tar and sugar formation when paraformaldehyde containing alkali is vaporized by heating. In preparing the stabilized product, hydrous or anhydrous sodium tetraborate may be used. Boric acid may also be employed since it is converted to the tetraborate by the subsequent addition of the alkaline catalyst. Generally amounts of stabilizer corresponding to at least 0.001% by weight (based on the weight of formaldehyde present in the solution) of sodium tetraborate ($Na_2B_4O_7$) will be required, and in practical applications amounts ranging from 0.001 to about 1.0% will usually be employed. Larger amounts can be used but generally are neither necessary nor recommended. Amounts within the range 0.001 to 0.1% are preferred. It is essential that the sodium tetraborate be added to the formaldehyde solution and completely dispersed therein before addition of the alkaline catalyst. The stabilizer may be added to the dilute solution, or at any stage of concentration. It is preferred to add the stabilizer when the solution has been concentrated to 80 to 85% formaldehyde.

The amount of alkaline catalyst added to the formaldehyde solution containing the stabilizer should be slightly greater than when no stabilizer is used because of the buffering action of the stabilizer. Accordingly, while the amount of alkaline catalyst ordinarily will fall within the range 0.01 to 1.0% by weight, based on the weight of formaldehyde present and preferably 0.03 to 0.30%, it should be understood that these ranges are merely approximate and that the required amount will vary depending upon the amount of stabilizer present.

The process is preferably carried out in the following manner: A 75 to 90%, preferably 80 to 85%, aqueous solution of formaldehyde is obtained or prepared in any desired manner. For example, a weaker aqueous solution of formaldehyde may be concentrated by vacuum evaporation in the conventional manner until a concentration of 75% to 90% has been reached.

This concentrated formaldehyde solution should have a temperature of between 80° C. and 110° C. preferably between 90° and 110° C. If necessary external heating may be applied. To this concentrated solution between 0.001 and 1.0% of sodium tetraborate, either the anhydrous salt or the decahydrate (borax) or an equivalent amount of boric acid is added in the form of a powder or in solution. Preferably 0.001 to 0.1% of borax in the form of a 5% aqueous solution, is added and the solution thoroughly mixed by suitable agitation. It is essential to distribute the borax uniformly through the formaldehyde before proceeding with the next step. The use of reduced pressure is unnecessary. After thorough mixing, between 0.01% and 1.0%, preferably between 0.03% and 0.3%, of the alkaline catalyst is added with agitation to the hot concentrated formaldehyde-borax solution in the receptacle. The alkaline catalyst may be added in powdered solid form or in solution, e. g., an aqueous or alcoholic solution. An aqueous solution having a strength of 5% to saturation of the alkaline material will usually be employed and a 20% to 50% aqueous solution is preferred.

The concentrated formaldehyde solution containing the borax and the alkaline catalyst should be agitated by stirring, vibration, passing an inert gas therethrough or in any other desired manner. The mass is then allowed to react for a short period of time, e. g., 1 to 30 minutes, to obtain a dry polymer. This process may be operated at atmospheric pressure or at subatmospheric pressure. If the process is operated at subatmospheric pressure, vacuum may be applied to the receptacle during the addition of the catalyst or as soon as the catalyst is added to the formaldehyde solution. A vacuum of less than 600 mm, mercury, e. g., 25 mm. to 600 mm. of mercury, is preferably applied to the receptacle for a period of 1 minute to ½ hour, after which a dry powdered paraformaldehyde of 95% to 97% formaldehyde concentration is obtained. By heating under vacuum for an additional ½ hour to 1 hour, a paraformaldehyde of unusually high formaldehyde concentration (98% to 99% formaldehyde) is obtained. It has been found that the presence of the borax stabilizer in paraformaldehyde prepared in this manner inhibits the formation of tars and sugars which leave a sticky residue to clog the vaporizer when the paraformaldehyde is vaporized by heat.

Any form of apparatus may be used which includes a reactor provided with means for effectively agitating the reactor charge, for heating the same, for charging the formaldehyde solution, the stabilizer and the alkaline catalyst thereinto and for removing the product. Apparatus such as that described and illustrated in my above application is especially suitable. It includes a kneading machine comprising a pair of kneading blades, a tightly fitting lid with an inlet pipe for the formaldehyde solution to be concentrated and an outlet line for water and formaldehyde vapors, properly located outlet for the powdered paraformaldehyde product, and a heating jacket. The heating jacket may be maintained at a given temperature by passing a hot fluid through the jacket by means of suitably arranged inlet pipes and outlet pipes. The jacket may alternatively or supplementarily be heated by means of an electrical heating coil.

During the evaporation process water vapor and some formaldehyde gas are removed through the outlet line. The line may be connected to a conventional formaldehyde absorption system containing a vacuum pump if vacuum is desired. Formaldehyde gases withdrawn through this line may thus be recovered.

In this particular form of apparatus, the process may be operated as follows: An aqueous solution of formaldehyde of any concentration is passed into the kneader through the inlet pipe. If an absorption system including a vacuum pump is provided, this is placed in operation. Steam or other heating medium is passed through the jacket in sufficient amount to maintain a temperature between 40° C. and 80° C. As the water and gaseous formaldehyde are withdrawn from the kneader, the solution therein becomes more concentrated. The kneading blades need not be operated during this preliminary concentration.

After concentration of the aqueous formaldehyde in the kneader reaches a concentration of 75% to 90% of formaldehyde, the temperature is adjusted to between 80° C. and 110° C. and the borax solution is added through the inlet pipe. The kneading blades are placed in operation for the purpose of thoroughly mixing the borax solution and the formaldehyde solution. This is accomplished in less than fifteen minutes with no appreciable polymerization of the formaldehyde resulting.

The alkaline catalyst is then added through the inlet pipe and agitation is continued. A vigorous exothermic polymerization reaction sets up immediately following the addition of the alkaline catalyst. If the formaldehyde composition in the kneader has a concentration of 87% to 90% at the time of the addition of the alkaline catalyst, sufficient water will be removed in 20 to 60 seconds to yield dry, powdered paraformaldehyde of 93% to 94% formaldehyde. Under these conditions a vacuum need not be applied.

Additional heating under vacuum of the powdered paraformaldehyde in the kneader will produce paraformaldehyde having a formaldehyde content of 98 to 99% in 15 minutes to 1 hour.

The stabilizer can be added any time prior to the addition of the catalyst, but it is preferred to add it to concentrated formaldehyde solution (75% to 90%). Such solution should have a temperature of 80° C. to 110° C. before addition of the catalyst. The solution may be heated to this temperature in any desired manner. The higher the temperature the faster the rate of polymerization. Variation of the temperature offers an effective means for controlling the reaction.

The stabilizer, when added in concentrations equivalent to 0.001 to 1.0% sodium tetraborate decahydrate by weight (based on the weight of the formaldehyde present) effectively inhibits the formation of tars and sugars in the vaporizer when the paraformaldehyde product is subsequently vaporized. The addition of stabilizer to the concentrated formaldehyde solution does not produce polymerization as it is not sufficiently alkaline to act as a polymerization catalyst. The above-described alkaline catalysts are effective in concentrations of 0.01 to 1.0% (based on the weight of formaldehyde present) with the rate of reaction or polymerization increasing substantially with an increase in concentration. The preferred concentration range of 0.03% to 0.3% produces a rapid reaction without introducing undue amounts of ash into the polymer. The alkaline catalyst may be added as a solid or in either aqueous or alcoholic solution. When solid sodium hydroxide was used, the local high concentration of catalyst appeared to catalyze the formation of polymer which formed a film around the solid and decreased its rate of solution and over-all rate of reaction. Catalyst in methanol solution was less effective than a corresponding amount of catalyst in water. This may be due to the reaction of methanol with the hydroxy end groups of the polymer chain to form methyl ether radicals which act as chain terminators in the polymerization reaction.

The following examples are given to illustrate the details of the invention.

*Example 1*

8,820 grams of 42.9% formaldehyde solution was vacuum concentrated to about 85%. The solution was heated to 90–100° C. 0.5 gram of borax as a 5% solution was then added with agitation. The formaldehyde solution remained clear with no apparent reaction. 2.0 grams of sodium hydroxide as a 25% solution was then added. Immediately a vigorous, exothermic reaction occurred forming paraformaldehyde. The paraformaldehyde was vacuum dried ½ hour to yield 1,665 grams of product containing about 98% formaldehyde. This paraformaldehyde did not form tars on total vaporization at 200° C.

*Example 2*

13,315 grams of 54.3% formaldehyde were vacuum concentrated to about 88%. The solution was heated to 90–100° C. 2 grams of borax as a 5% solution was then added. After a short period of agitation, 1.06 grams of sodium hydroxide as a 25% solution was added. Immediately a vigorous exothermic reaction occurred forming paraformaldehyde which was then vacuum dried to 98%. No tars were formed on vaporization of the paraformaldehyde at 200° C.

*Example 3*

3,600 lbs. of about 43% formaldehyde was vacuum concentrated to about 84%. The solution was heated to 90–100° C. 45 grams of borax as a 5% solution was added and the solution agitated 10 minutes. 454 grams of sodium hydroxide as a 25% solution was then added. Immediately a vigorous exothermic reaction occurred forming paraformaldehyde which was vacuum dried to over 98%. No tars were formed on vaporization of the paraformaldehyde at 200° C.

*Example 4*

The following example demonstrates that tars are formed when the borax stabilizer is not present.

3,600 lbs. of about 43% formaldehyde was vacuum concentrated to about 85%. The solution was heated to 95–100° C. 454 grams of sodium hydroxide as a 25% solution was then added. An exothermic reaction occured immediately forming paraformaldehyde which was vacuum dried to over 98%. On vaporization of this paraformaldehyde at 200° C., tarry residues were obtained equivalent to 0.7% of the paraformaldehyde vaporized.

The examples in this specification have been directed specifically to the use of borax (sodium tetraborate decahydrate) as stabilizer. Other boron compounds such as anhydrous sodium tetraborate and boric acid may be effectively substituted for borax in the process of this invention, as may also alkali metal tetraborates other than sodium, but not including ammonium salts. However, the use of sodium tetraborate, particularly in the form of borax, is generally preferred.

Reference in the specification and claims to parts, proportions and percentages unless otherwise specified refers to parts, proportions and percentages by weight.

I claim:

1. The process for producing paraformaldehyde comprising adding to an aqueous formaldehyde solution 0.001 to 1.0% of a boron compound of the group consisting of the alkali metal tetraborates and compounds yielding alkali metal tetraborates under the specified conditions of use, agitating the resulting mixture and adding thereto, when the temperature thereof is 80 to 110° C. and its formaldehyde content is 75 to 90%, 0.01 to 1.0% of an alkaline catalyst from the group consisting of sodium and potassium hydroxides, carbonates, formates and acetates, the amount of said catalyst added being sufficient to catalyze the formation of paraformaldehyde, and agitating the resulting mixture.

2. Process according to claim 1, in which the boron compound is sodium tetraborate.

3. The process for the production of paraformaldehyde which comprises adding to an aqueous formaldehyde having a concentration of 75% to 90% formaldehyde and having a temperature of 80° C. to 110° C., 0.001% to 1.0% of a boron compound from the group consisting of alkali metal tetraborates and compounds yielding alkali metal tetraborates under the specified conditions of use, agitating the resulting mixture and then adding thereto 0.01% to 1.0% of an alkaline catalyst from the group consisting of sodium and potassium hydroxides, carbonates, formates and acetates, the amount of said catalyst added being sufficient to catalyze the formation of paraformaldehyde and agitating the resulting composition at a subatmospheric pressure of less than 600 mm. Hg.

4. The process for the production of paraformaldehyde which comprises adding to an aqueous formaldehyde having a concentration of 80% to 85% formaldehyde and a temperature of 80° C. to 110° C., 0.001% to 1.0% of a boron compound from the group consisting of alkali metal tetraborates and compounds yielding alkali metal tetraborates under the specified conditions of use, agitating the resulting mixture and adding thereto 0.03% to 0.3% of an alkaline catalyst from the group consisting of sodium and potassium hydroxides, carbonates, formates and acetates, the amount of said catalyst added being sufficient to catalyze the formation of paraformaldehyde and agitating the resulting composition.

5. The process for the production of paraformaldehyde which comprises adding to an aqueous formaldehyde having a concentration of 80% to 85% formaldehyde and having a temperature of from 80° C. to 110° C., 0.001% to 0.1% of sodium tetraborate, agitating the resulting mixture and adding thereto 0.03% to 0.3% of an alkaline catalyst taken from the group consisting of sodium and potassium hydroxides, carbonates, formates and acetates, and agitating the resulting composition.

6. Process according to claim 3 wherein the alkaline catalyst is sodium hydroxide.

7. Process according to claim 3 in which the boron compound is sodium tetraborate and the alkaline catalyst is sodium hydroxide.

8. A composition comprising an intimate mixture of solid paraformaldehyde with 0.01 to 1.0% of an alkaline material from the group consisting of sodium and potassium hydroxides, carbonates, formates and acetates, and 0.001 to 1.0% of an alkali metal tetraborate.

9. A composition according to claim 8 wherein the tetraborate is sodium tetraborate.

10. A composition according to claim 9 wherein the sodium tetraborate content is 0.001 to 0.1%.

References Cited in the file of this patent

UNITED STATES PATENTS

| Number | Name | Date |
|---|---|---|
| 2,162,616 | Herrmann | June 13, 1939 |
| 2,551,365 | Craven | May 1, 1951 |

FOREIGN PATENTS

| Number | Country | Date |
|---|---|---|
| 54,789 | Sweden | June 13, 1923 |
| 303,258 | Great Britain | Jan. 3, 1929 |